UNITED STATES PATENT OFFICE.

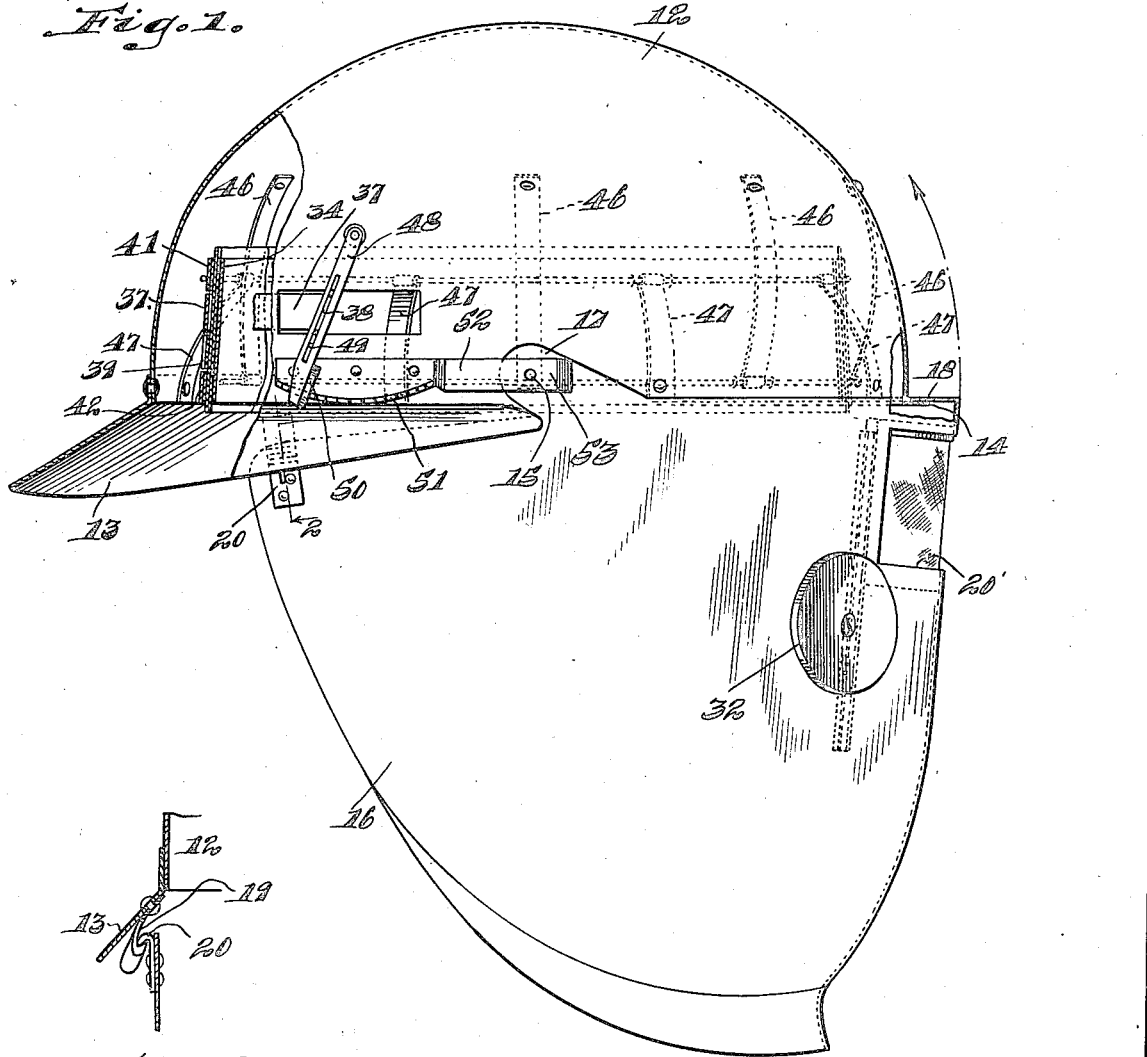

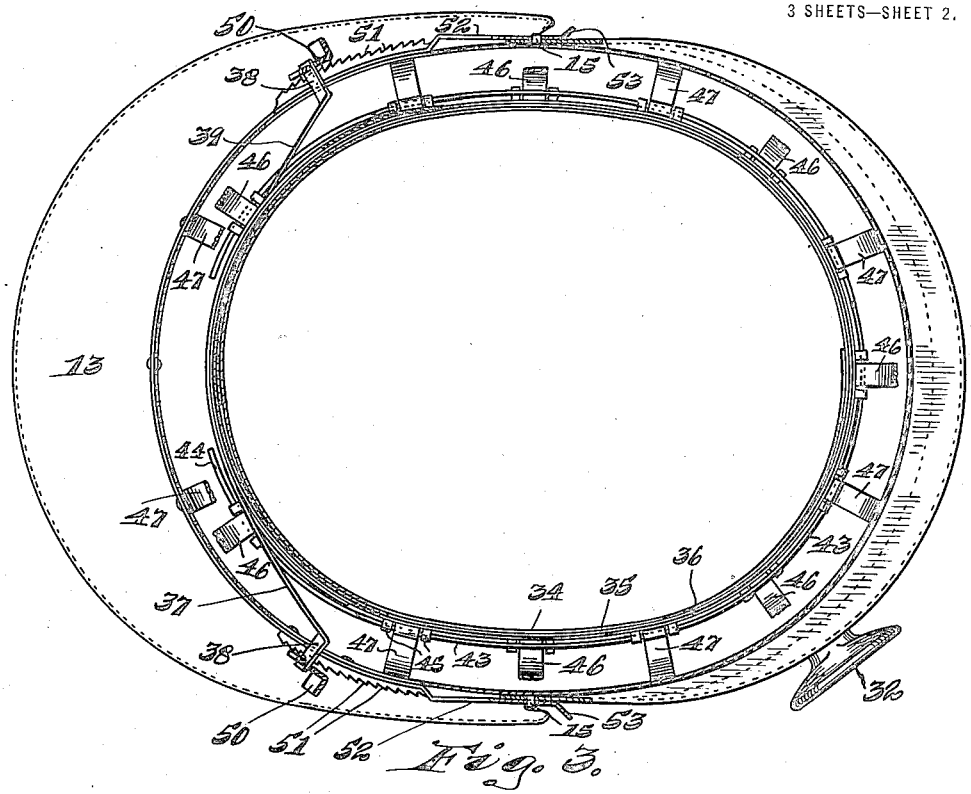
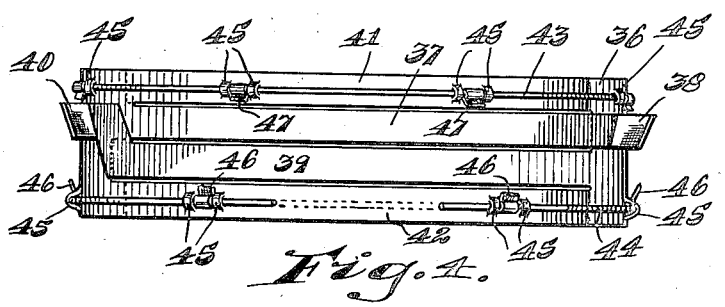

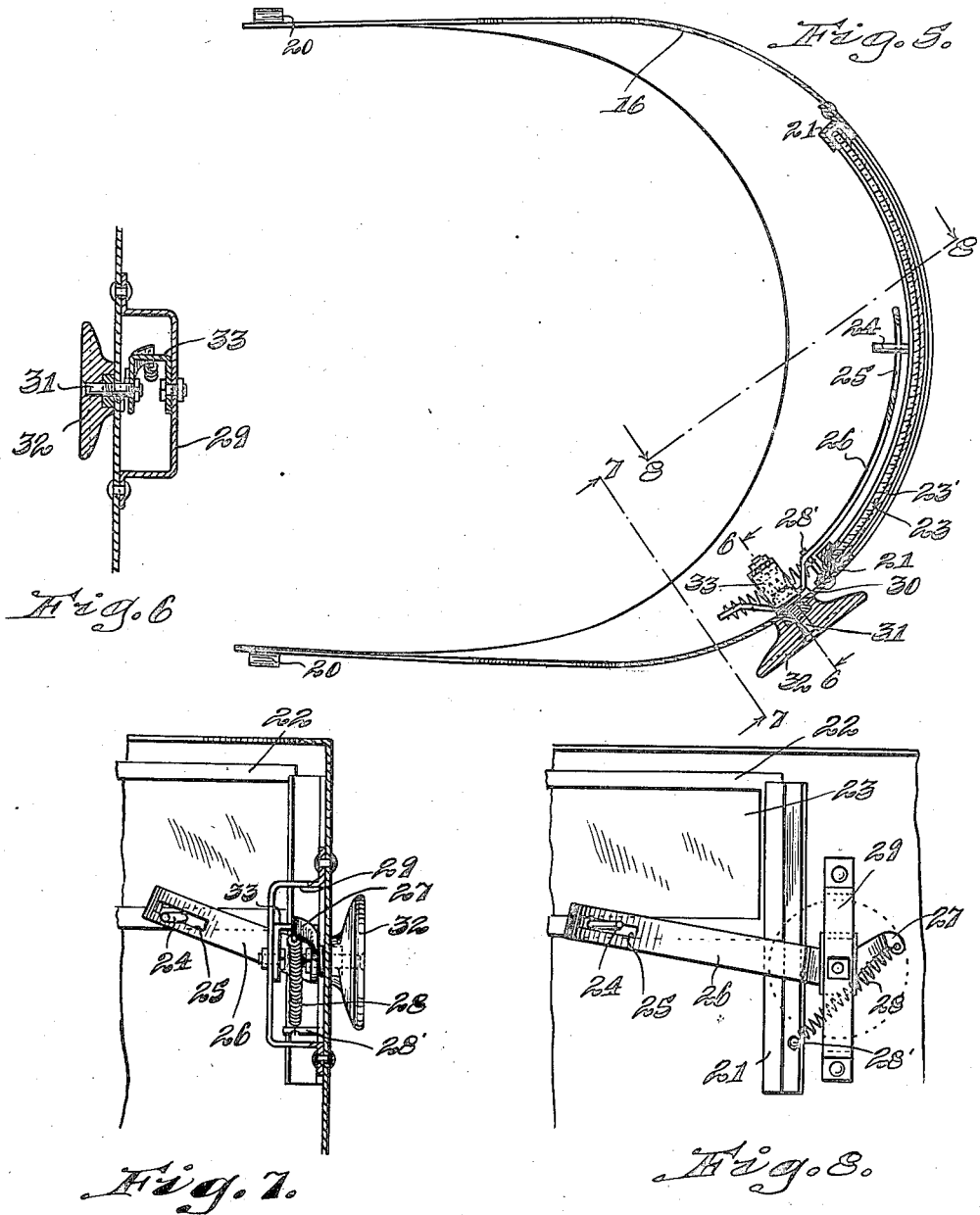

JOHN M. LIGHTFIELD, OF CHICAGO, ILLINOIS.

WELDING HOOD.

1,416,848.                Specification of Letters Patent.      Patented May 23, 1922.

Application filed January 9, 1920. Serial No. 350,254.

*To all whom it may concern:*

Be it known that I, JOHN M. LIGHTFIELD, a citizen of the United States, and a resident of the city of Chicago, county of Cook, and State of Illinois, have invented certain new and useful Improvements in Welding Hoods, of which the following is a specification.

My invention relates to new and useful improvements in welding hoods, and has for its object the provision in a welding hood of means for adjusting the same to fit various sized heads.

Another object is the provision of a welding hood having a pivotally mounted face guard.

Another object is the provision of a welding hood having a face shield equipped with a transparent guard for the eyes.

Other objects will appear hereinafter.

The invention consists in the combinations and arrangements of parts hereinafter described and claimed.

The invention will be best understood by reference to the accompanying drawings forming a part of this specification, and in which, Fig. 1, is a side elevational view of the invention with parts removed, Fig. 2, is a sectional view illustrating the clasp used in the invention, Fig. 3, is a longitudinal horizontal sectional view of the invention, Fig. 4, is a side elevational view of the adjustable band used in the invention, Fig. 5, is a longitudinal horizontal sectional view of the shield used in the invention, Fig. 6, is a sectional view taken on substantially line 6—6 of Fig. 5, Fig. 7, is a sectional view taken on substantially line 7—7 of Fig. 5, and Fig. 8, is a sectional view taken on substantially line 8—8 of Fig. 5.

The approved form of construction comprises a metallic shell or cap 12, having mounted at the rearward side thereof a downwardly inclined deflecting shield 13 which is also preferably made of metal and resembles very closely in its form and structure a peak of a cap. The invention is designed for use by one, operating an electric welding machine and affords protection to the operator both from the particles of molten metal which are thrown up from the metal being welded and also to afford a means of protecting the eyes of the operator from the very strong light which is produced in such a process. The member 13 serves to deflect the particles of metal which may be thrown up from the device operated upon and thereby prevent the same from rolling down the back of the neck of the operator.

Provided upon the front portion of the member 12 is an outwardly extending flange 14 which is designed to engage against an inwardly extending flange 18 mounted upon the upper front edge of the face guard or shield 16 which is pivotally mounted upon a post 15 by means of a lug 17, the post 15 being rigidly attached to the shell 12. When the shield 16 is pivotally mounted upon the cap 12, the same may be swung upwardly over the cap 12 in the direction indicated by the arrow in Fig. 1. When in operation, the member 16 is swung downwardly until the flange 18 engages the flange 14, in which position the face of the operator is protected by the shield. This shield 16 may be made of any suitable material which is sufficiently rigid to maintain its shape and at the same time light enough to prevent any great strain upon the head of the user. When the device is swung downwardly into operative position, the same is retained in this position by means of a clasp which comprises inter-locking hooks, one hook 19 of which is fastened upon the shield 13 and the other 20 of which is fastened upon the member 16. In order to release the member 16 or unfasten the clasp the hook 20 may be raised and pressed inwardly upon which a disengagement of the hooks 19 and 20 may take place.

Provided in the front side of the shield 16 is an opening 20', through which the operator may watch his work when the shield 16 is in operative position. Extending vertically, are guide members 21 which are formed in the shape of a Z and serve to retain in loosely mounted position a frame 22 in which may be mounted any suitable transparent material 23 which will afford protection to the eyes of the wearer. The members 21, of course, are positioned at opposite sides of the frame 22. I have shown in Fig. 5, two plates of transparent material mounted in the frame 22, one of which 23 may be of ordinary transparent material such as isinglass and the other 23', a transparent member of any suitable material and colored so as to allow less light to strike the eyes of the operator. The member 22 is slidably mounted upon the member 16 in the manner indicated, for the purpose of allowing the operator to view his work through the opening 20' without looking through any of the transparent material. In order to do this, the frame 22 is slid downwardly in the guide members 21. To accomplish this, I provide a post 24 which is mounted upon the member 22, said post 24 engaging in an elongated slot 25 which is formed in a curved arm 26. Adjacent the opposite end of the arm 26 is an offset portion 30 which is rigidly mounted upon a bolt 31 which projects through a thumb nut 32. The construction is such that upon turning the nut 32, the bolt 31 is thereby turned and the arm 26 moved pivotally upon the bolt 31. As clearly shown in Fig. 6, the bolt 31 is secured to a U-shaped stop member 33 which is mounted upon a bracket 29 which is secured to the shield 16. To the extreme opposite end 27 of the member 26 is attached a spiral spring 28, one end of which is secured to a bolt 28' mounted upon the member 21. The assembly of the parts is such that when the frame 22 is in operative position such as indicated in Fig. 8, the spiral spring serves to retain the same in position. Upon turning the end 32 so as to lower the frame 22 and permit the operator to view the object through the opening 20', the bar 26 is moved upon its pivot and the end 27 is carried past center so that the spiral spring in this position serves to retain the frame 22 in its lowered or operative position. The member 33 serves as a stop to limit the movement of the arm 26 in both directions.

To secure the cap 12 upon the head of the operator, I provide a band which comprises an inner layer of leather 34, super-imposed upon which is a rubber band 35, each end of these bands overlapping its opposite end and the bands themselves being joined together intermediate their ends by any suitable means such as stitching. A third layer which comprises an aluminum band is positioned upon the rubber band and secured thereto. This aluminum band 36 is slit at one end to form three tongues 37, 41, 42, the central tongue 37 of which has its end 38 laterally turned, as clearly seen in Fig. 4. The opposite end of the band 36 is provided with a tongue 39, the end of which is turned upwardly and bent outwardly forming a portion 40 which extends outwardly from the band 36 and aligned horizontally with the member 38. Lips 45 are punched outwardly from the band 36 to form knuckles for the reception of wires 43 and 44 which are mounted upon the member 36 adjacent its opposite edges. As shown in Fig. 4, the opposite ends of the members 43 and 44 are spaced apart. The band comprising the three layers mentioned is secured to the shell 12 by means of straps 46 which are riveted adjacent one end to the shell 12. The opposite end of the straps 46 is curled to embrace the wire 44 intermediate the knuckles 45 and similar straps 47 are likewise secured to the shell 12 and curled at their free ends to engage the wire 43 intermediate the knuckles 45. Mounted upon the shell 12 at opposite sides thereof and adjacent the rearward end are levers 48 which are provided intermediate their ends with an elongated slot 49 in which the outwardly projecting portion 38 or 40 is adapted to engage. The lower free end of the member 48 is provided with a tumb piece 50 by means of which the same may be swung upon its point of pivotal connection. Projecting inwardly from the free end of the members 48 is a tack which is adapted to engage the teeth 51 provided upon a lever rack bar 52 which is rigidly mounted upon the shell 12. By virtue of this form of mounting, the band which engages the head of the wearer may be adjusted to fit different sized heads, the adjustment being brought about through a manipulation of the lever 48. By adjusting the levers 48 so as to bring the members 38 and 40 into closer relation with each other, the band is enlarged and similarly in adjusting the levers 48 to an increased distance between the members 38 and 40, the size of the band is lessened. As shown in Fig. 1, the end 53 of the member 52 is provided with an opening which is adapted to engage the stud or post 15. It will be noticed that the member 53 must first be removed from the stud 15 before the shield 16 may be detached from the shell 12, thereby preventing an accidentally loosening of the member 16 from the member 12.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:—

1. A welding hood comprising a cap; a deflecting shield mounted on the rearward end of said cap; hooks on said shield; a face shield pivotally mounted on said cap; and hooks on said face shield adapted to engage hooks on the deflecting shield for retaining same in operative position.

2. A welding hood comprising a cap; a face shield pivotally mounted on said cap for supporting said face shield in operative position; and fastening means on said shield and said cap for detachably securing said face shield against retraction from operative position.

3. A welding hood comprising a cap; a face shield mounted on said cap and having an opening provided adjacent its upper edge; guide bars mounted adjacent said opening; a shield carrying frame slidably mounted in said guide bars; and means operable by sliding movement of said frame for automatically retaining same in operative or inoperative position, substantially as described.

4. A welding hood comprising a cap; a face shield mounted on said cap and having an opening provided adjacent its upper edge; guide bars mounted adjacent said opening, a shield carrying frame slidably mounted on said guide bars and adapted, when in operative position, to serve as a closure for said opening; a lever for sliding said frame to operative or inoperative position; and means on said lever for retaining said frame in operative or inoperative position, substantially as described.

5. A welding hood comprising a cap; a face shield mounted on said cap and having an opening provided adjacent its upper edge; guide bars mounted adjacent said opening; a shield carrying frame mounted to slide in said guide bars; a lever for moving said frame to operative or inoperative position; an arm on said lever; and resilient means engaging said arm for retaining said frame in operative or inoperative position, substantially as described.

6. A face shield having an opening provided adjacent its upper edge; guide bars mounted adjacent said opening; a shield carrying frame mounted to slide in said guide bars; a lever for moving said frame to operative or inoperative position; an arm on said lever; and resilient means engaging said arm for retaining said frame in operative or inoperative position, substantially as described.

7. A welding hood comprising a cap; a face shield mounted on said cap and having an opening provided adjacent its upper edge; guide bars mounted adjacent said opening; a shield carrying frame mounted in said guide bars and adapted, when in operative position, to serve as a closure for said opening; a lever for moving said frame to operative or inoperative position; a cam on said lever and resilient means on said lever engaging said cam for retaining said transparent means in operative or inoperative position, substantially as described.

In testimony whereof I have signed my name to this specification in the presence of two subscribing witnesses.

JOHN M. LIGHTFIELD.

Witnesses:
JOSHUA R. H. POTTS,
ROSE K. TRIB.